(12) United States Patent
Zhang et al.

(10) Patent No.: US 11,796,859 B2
(45) Date of Patent: Oct. 24, 2023

(54) DISPLAY APPARATUS WITH MICRO LIGHT EMITTING DIODE LIGHT BOARD

(71) Applicant: Hisense Visual Technology Co., Ltd., Shandong (CN)

(72) Inventors: Nannan Zhang, Shandong (CN); Fulin Li, Shandong (CN); Jinlong Li, Shandong (CN); Mingsheng Qiao, Shandong (CN); Xiaowei Liu, Shandong (CN); Xiao Li, Shandong (CN); Yushuai Zhai, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 17/656,766

(22) Filed: Mar. 28, 2022

(65) Prior Publication Data
US 2022/0214579 A1    Jul. 7, 2022

Related U.S. Application Data

(63) Continuation of application No. PCT/CN2021/081821, filed on Mar. 19, 2021.

(30) Foreign Application Priority Data

Mar. 25, 2020  (CN) .......................... 202010221021.1
Apr. 28, 2020  (CN) .......................... 202010351591.2
(Continued)

(51) Int. Cl.
*G02F 1/13357* (2006.01)
*G02F 1/1335* (2006.01)

(52) U.S. Cl.
CPC .. *G02F 1/133603* (2013.01); *G02F 1/133605* (2013.01); *G02F 1/133607* (2021.01); *G02F 1/133608* (2013.01)

(58) Field of Classification Search
CPC ......... G02F 1/133608; G02F 1/133605; G02F 1/133607
See application file for complete search history.

(56) References Cited

U.S. PATENT DOCUMENTS

2005/0045897 A1    3/2005 Chou et al.
2010/0061084 A1*   3/2010 Lee ................... G02F 1/133608
                                                        362/97.1
(Continued)

FOREIGN PATENT DOCUMENTS

CN    101281321 A    10/2008
CN    101440925 A    5/2009
(Continued)

OTHER PUBLICATIONS

International Search Report, dated Jun. 23, 2021, for PCT/CN2021/081821 filed Mar. 19, 2021.
(Continued)

*Primary Examiner* — Karabi Guharay
(74) *Attorney, Agent, or Firm* — Workman Nydegger

(57) ABSTRACT

A display apparatus, comprising a functional layer on the light emitting side of a light source and a diffusion plate. A support for the diffusion plate is arranged between the light source and the functional layer, a cushion portion is arranged between the support and the functional layer, and the cushion portion is in contact with the support and the functional layer. Pressure of the support on the functional layer is reduced by providing the cushion portion between the support and the functional layer.

18 Claims, 7 Drawing Sheets

(30) Foreign Application Priority Data

| Apr. 28, 2020 | (CN) | 202020687645.8 |
| May 26, 2020 | (CN) | 202010453658.3 |
| May 28, 2020 | (CN) | 202010468356.3 |
| Jun. 10, 2020 | (CN) | 202010522067.7 |
| Aug. 7, 2020 | (CN) | 202010791424.X |
| Aug. 7, 2020 | (CN) | 202010791451.7 |
| Aug. 24, 2020 | (CN) | 202010855892.9 |
| Dec. 18, 2020 | (CN) | 202011508504.6 |

(56) References Cited

U.S. PATENT DOCUMENTS

| 2013/0010230 A1 | 1/2013 | Matsuki et al. |
| 2019/0265551 A1* | 8/2019 | Liu .................. G02F 1/133608 |
| 2020/0159073 A1 | 5/2020 | Kyoukane et al. |
| 2022/0299826 A1* | 9/2022 | Kurokawa ............ G02F 1/0136 |

FOREIGN PATENT DOCUMENTS

| CN | 101529323 A | 9/2009 |
| CN | 101666943 A | 3/2010 |
| CN | 101782203 A | 7/2010 |
| CN | 102478178 A | 5/2012 |
| CN | 102478187 A | 5/2012 |
| CN | 102694106 A | 9/2012 |
| CN | 104285196 A | 1/2015 |
| CN | 104765198 A | 7/2015 |
| CN | 106782128 A | 5/2017 |
| CN | 108303822 A | 7/2018 |
| CN | 108490685 A | 9/2018 |
| CN | 109557721 A | 4/2019 |
| CN | 110398857 A | 11/2019 |
| CN | 110456574 A | 11/2019 |
| CN | 110543049 A | 12/2019 |
| CN | 110908181 A | 3/2020 |
| CN | 110928038 A | 3/2020 |
| CN | 210294751 U | 4/2020 |
| CN | 210835515 U | 6/2020 |
| CN | 111399280 A | 7/2020 |
| CN | 210982988 U | 7/2020 |
| CN | 210982989 U | 7/2020 |
| CN | 211979375 U | 11/2020 |
| CN | 113126363 A | 7/2021 |
| CN | 113777826 A | 12/2021 |
| EP | 0735952 A1 | 10/1996 |
| JP | 2010272418 A | 12/2010 |
| JP | 2018106971 A | 7/2018 |
| JP | 2018207048 A | 12/2018 |
| KR | 20050116642 A | 12/2005 |
| TW | I255896 B | 6/2006 |

OTHER PUBLICATIONS

Chinese Office Action, dated Aug. 5, 2022, from Chinese Patent Application No. 202010791424.X.

Chinese Office Action, dated Jun. 17, 2022, from Chinese Patent Application No. 202010791451.7.

Chinese Office Action, dated Jul. 14, 2022, from Chinese Patent Application No. 202010855892.9.

Chinese Office Action, dated Sep. 29, 2022, from Chinese Patent Application No. 202010855892.9.

Chinese Office Action, dated Oct. 27, 2022, from Chinese Patent Application No. 202011182703.2.

Chinese Office Action, dated Apr. 25, 2022, from China Patent Application No. 202010522067.7.

* cited by examiner

DISPLAY APPARATUS WITH MICRO LIGHT EMITTING DIODE LIGHT BOARD

CROSS REFERENCE TO RELATED APPLICATIONS

This application is a continuation application of PCT PCT/CN2021/081821, filed on Mar. 19, 2021, which claims priorities to Chinese patent application No. 202010221021.1 filed on Mar. 25, 2020, No. 202010351591.2 filed on Apr. 28, 2020, No. 202020687645.8 filed on Apr. 28, 2020, No. 202010453658.3 filed on May 26, 2020, No. 202010522067.7 filed on Jun. 10, 2020, No. 202010468356.3 filed on May 28, 2020, No. 202010855892.9 filed on Aug. 24, 2020, No. 202010791424.X filed on Aug. 7, 2020, No. 202010791451.7 filed on Aug. 7, 2020, and No. 202011508504.6 filed on Dec. 18, 2020, the entire contents of which are incorporated herein by reference.

FIELD

The present application relates to display technology, in particular to a display apparatus.

BACKGROUND

As the mainstream display screen at present, a liquid crystal display screen has the advantages of low power consumption, small size, low radiation and the like. A liquid crystal panel is not self-lit panel, and needs to be used together with a backlight module.

In direct backlight module, a diffusion plate is usually required, and a certain distance generally exists between light sources and the diffusion plate to guarantee full light mixing between the light sources and improve the brightness uniformity of backlight display.

In order to optimize an emitting angle of backlight and the backlight uniformity, in a direct backlight module, functional films will be added under the diffusion plate. A diffusion plate support is in direct contact with the functional films, the functional films are soft, and if the diffusion plate has relative motions, the diffusion plate support will unavoidably scratch the functional films, causing failure of required optical performances of the functional films, leading poor display and the like.

SUMMARY

A display apparatus according to some embodiments of the present application includes: a panel, configured to display an image; a light source on an incident side of the panel, configured to provide backlight for the panel; a diffusion plate on a light emitting side of the light source; a functional layer on a side of the diffusion plate facing the light source; a support between the light source and the functional layer and configured to support the diffusion plate; and a cushion portion between the support and the functional layer and configured to contact the support and the functional layer so as to mitigate pressure of the support for the functional layer.

In some embodiments of the present application, the cushion portion is on a surface of a side of the support facing the functional layer; or the cushion portion is on a surface of a side of the functional layer facing the support.

In some embodiments of the present application, an area of a cross section of the cushion portion parallel to the functional layer is greater than an area of a cross section of the support parallel to the functional layer and close to the functional layer.

In some embodiments of the present application, the cushion portion is of a shape of a sphere, a hemisphere or an ellipsoid; and the support is of a shape of a tetrahedron, a pyramid, a cone, a cuboid, a cube or a cylinder.

In some embodiments of the present application, the cushion portion is made of silica gel or epoxy resin.

In some embodiments of the present application, the light source is a micro light emitting diode light board, and a height of the cushion portion and a height of the support meet a following relationship: $0.2 \leq (H1+H2-\Delta H)/p \leq 0.8$; wherein H1 represents a height of the support, H2 represents an original height of cushion portion, $\Delta H$ represents a deformation of the cushion portion, and p represents a distance between every two adjacent micro light emitting diodes in the micro light emitting diode light board.

In some embodiments of the present application, the height of the support is smaller than 6 mm.

In some embodiments of the present application, the support is fixed to the micro light emitting diode light board through buckles, screws or adhesive.

In some embodiments of the present application, the micro light emitting diode light board includes: a circuit board, configured to provide a driving signal; at least one micro light emitting diodes on the circuit board in an array; an packaging layer on a surface of a side of the micro light emitting diode away from the circuit board; and a reflective sheet on a surface of a side of the circuit board facing the micro light emitting diode, wherein the reflective sheet is provided with openings for exposing the at least one micro light emitting diodes; wherein the support is fixed at interval area among the at least one micro light emitting diodes.

In some embodiments of the present application, the packaging layer covers surfaces of the micro light emitting diodes as a whole layer; or the packaging layer covers the surfaces of the micro light emitting diodes, and the packaging layer has individual dot patterns; or the packaging layer covers micro light emitting diode rows or micro light emitting diode columns, and the packaging layer has individual strip-shaped patterns.

In some embodiments of the present application, a thickness of the diffusion plate is 1.5 mm to 3 mm.

In some embodiments of the present application, the diffusion plate has scattering particle materials inside.

In some embodiments of the present application, the functional layer is configured to reflect light rays with small incident angles emitted from the light source and transmit light rays with large incident angles emitted from the light source.

In some embodiments of the present application, the functional layer includes film layers with different refraction indexes and arranged in a laminated mode.

In some embodiments of the present application, the support is distributed at interval area among the micro light emitting diodes.

In some embodiments of the present application, the support is fixed to the micro light emitting diode light board through a limiting sheet, an auxiliary column and a buckle.

In some embodiments of the present application, the limiting sheet and the buckle are at two ends of the auxiliary column respectively.

In some embodiments of the present application, the display apparatus further includes a group of films on a side of the diffusion plate away from the light source.

In some embodiments of the present application, the group of films includes a quantum dot layer or a fluorescent layer.

In some embodiments of the present application, the group of films includes a prism sheet.

100—backlight module, 200—panel, 11—back plate, 12—light source and micro light emitting diode light board, 13—diffusion layer, 14—first functional layer, 15—support, 16—transparent substrate, 17—wavelength conversion layer, 18—second functional layer, 19—optical film, 121—circuit board, 122—micro light emitting diode, 123—reflective layer, and 124—packaging layer.

DETAILED DESCRIPTION OF THE EMBODIMENTS

In order to make the objectives, features and advantages of the present application more obvious, the present application will be further described below in combination with the accompanying drawings and embodiments. However, example embodiments can be implemented in a variety of forms and should not be construed as limited to the implementations set forth herein.

A liquid crystal display apparatus is mainly includes a backlight module and a liquid crystal panel. The liquid crystal panel does not emit light itself, and needs to use a light source provided by the backlight module to achieve brightness display.

The work principle of the liquid crystal display apparatus is that liquid crystals are placed between two pieces of conductive glass, the electric field effect which is driven by an electric field between two electrodes causes distortion of liquid crystal molecules, so as to control transmission or shielding for light emitting from a backlight source, thereby displaying images. If color light filters are added, color images may be displayed.

Figure 1:
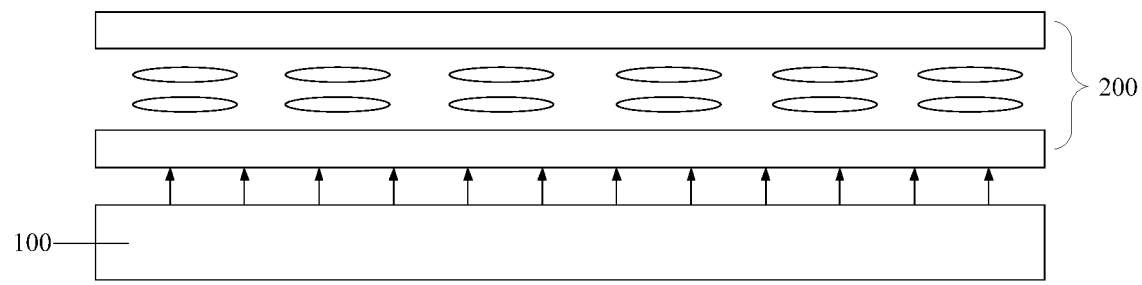
FIG. 1 is a schematic cross-sectional view of a display apparatus according to an embodiment of the present application.

FIG. 1 is a schematic cross-sectional view of a display apparatus according to an embodiment of the present application.

Referring to FIG. 1, the display apparatus includes: a backlight module 100 and a panel 200. The backlight module 100 is configured to provide a backlight source for the panel 200, and the panel 200 is configured to display images.

The backlight module 100 is usually located at the bottom of the display apparatus, with its shape and size being adaptive to those of the display apparatus. When applied to devices such as a television or a mobile terminal, the backlight module is usually in a rectangular shape.

The backlight module in the embodiments of the present application adopts a direct backlight module which is configured to uniformly emit light rays in a whole light emitting surface to provide light rays full in brightness and uniform in distribution for the panel, so that the panel can normally display images.

The panel 200 is located on a light emitting side of the backlight module 100, and a shape and size of the panel are usually matched with those of the backlight module. Usually, the panel 200 may be rectangular, including a top side, a bottom side, a left side and a right side. The top side and the bottom side are opposite, the left side and the right side are opposite, the top side is connected with one end of the left side and one end of the right side, and the bottom side is connected with the other end of the left side and the other end of the right side.

The panel 200 is a panel which is able to transmit light and adjust transmittance of light, but the panel does not emit light itself. The panel 200 has a plurality of pixel units arranged in an array, and each pixel unit may independently control a transmittance and color of light rays entering the pixel unit from the backlight module 100 to make light rays transmitted through all the pixel units form a displayed image.

Figure 2:
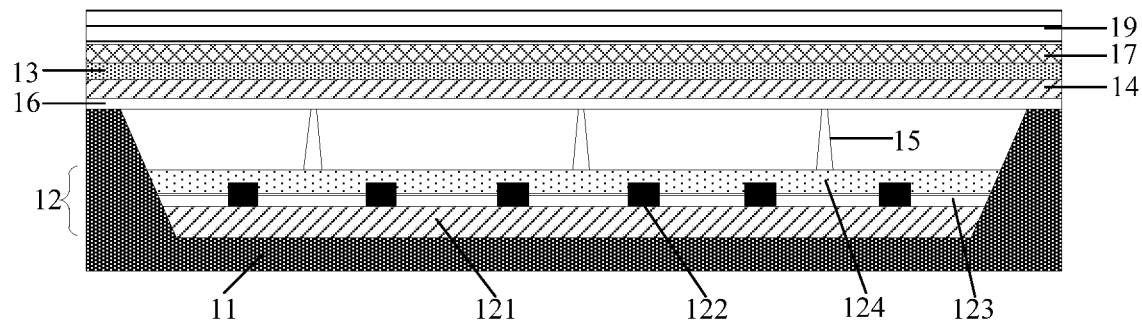
FIG. 2 is a first schematic cross-sectional view of a backlight module according to an embodiment of the present application.

FIG. 2 is a first schematic cross-sectional view of the backlight module according to an embodiment of the present application.

Referring to FIG. 2, the backlight module according to the embodiment of the present application includes: a back plate 11, a light source 12, a diffusion layer 13, a first functional layer 14, a support 15 and a transparent substrate 16.

The back plate 11 is located at the bottom of the backlight module and configured for supporting. Usually, the back plate 11 is of a square or rectangular structure, and when the back plate is applied to a special-shaped display apparatus, a shape of the back plate is adaptive to a shape of the display apparatus.

The back plate 11 includes a top side, a bottom side, a left side and a right side. The top side and the bottom side are opposite, the left side and the right side are opposite, the top side is connected with one end of the left side and one end of the right side, and the bottom side is connected with the other end of the left side and the other end of the right side.

A material of the back plate 11 is aluminum, iron, aluminum alloy or iron alloy. The back plate 11 is configured to fix the light source 12 and support and fix edge areas of components such as an optical film and a diffusion plate, and the back plate 11 also has an effect of dissipating heat for the light source 12.

In the embodiments of the present application, the backlight module is a direct backlight module, and the light source 12 is located on the back plate 11. Usually, the light source 12 may be a light bar or a light board.

The light bar or the light board is provided with point light sources, and the point light sources may be light emitting diodes or micro light emitting diodes. As a backlight source, compared with traditional light emitting diodes, the micro light emitting diodes have a smaller size and can achieve finer dynamic control and improve dynamic contrast of the display apparatus.

In the embodiments of the present application, the light source 12 may be a micro light emitting diode light board (12), and the whole micro light emitting diode light board (12) may be square or rectangular, with a length of 200 mm to 800 mm and a width of 100 mm to 500 mm.

A plurality of micro light emitting diode light boards (12) may be arranged according to a size of the display apparatus, and the micro light emitting diode light boards (12) are spliced to collectively provide backlight. In order to avoid optical problems caused by splicing of the micro light emitting diode light boards (12), splicing seams between the adjacent micro light emitting diode light boards (12) are made as small as possible, and even seamless splicing is achieved.

Referring to FIG. 2, the micro light emitting diode light board (12) includes: a circuit board 121, micro light emitting diodes 122, a reflective layer 123 and a packaging layer 124.

The micro light emitting diode light board may be formed through two surface mounting manners: POB and COB. POB is short for package on board, and means that LED chips are packaged (large-size bonding pad) and then mounted to a circuit board; and COB is short for chip on board, and means that LED chips are directly mounted on a circuit board.

The two mounting manners can both apply to the micro light emitting diode light board in the present application.

In the embodiments of the present application, the micro light emitting diodes adopt micro light emitting diode chips of a micron size.

Next, a structure of the micro light emitting diode light board formed through a COB manner is taken as an example for discussion in detail.

In some embodiments, the micro light emitting diode light board 12 is a mini-LED light board.

The circuit board 121 is located on the back plate 11, and a shape of the circuit board 121 is substantially same as an overall shape of the micro light emitting diode light board (12). Usually, the circuit board 121 is in a plate shape and is rectangular or square as a whole. The circuit board 121 has a length of 200 mm to 800 mm and a width of 100 mm to 500 mm.

In the embodiments of the present application, the circuit board 121 may be a printed circuit board (PCB), the PCB includes an electronic circuit and an insulating layer, and the insulating layer exposes one or more bonding pads in the electronic circuit for welding the micro light emitting diodes and covers remaining parts in the electronic circuit.

Or, the circuit board 121 may also be an array substrate formed by manufacturing a thin film transistor driving circuit on a base substrate, and a surface of the array substrate has electrodes connected to the thin film transistor driving circuit for welding the micro light emitting diodes.

A base or substrate of the circuit board 121 may be made of materials such as FR4 or glass, or a base or base substrate of the circuit board 121 may be made of a flexible material to form a flexible display apparatus.

The circuit board 121 is configured to provide a driving electric signal for the micro light emitting diodes 122. The micro light emitting diodes 122 and the circuit board 121 are separately manufactured, a surface of the circuit board 121 includes a plurality of bonding pads for welding the micro light emitting diodes 122, the micro light emitting diodes 122 are transferred above the bonding pads after being manufactured, the micro light emitting diodes 122 are welded to the circuit board 121 through processes such as reflow soldering, and thus the micro light emitting diodes 122 may be driven to emit light by controlling an input signal of the circuit board 121.

The micro light emitting diodes 122 are located on the circuit board. Electrodes of the micro light emitting diodes 122 are welded to the bonding pads exposed on the circuit board 121 to achieve electric connection therebetween.

The micro light emitting diodes 122 are different from ordinary light emitting diodes, and specifically refer to micro light emitting diode chips. Since the micro light emitting diodes 122 have small sizes, dynamic light emitting of the backlight module can be controlled to smaller partitions, which contributes to improve picture contrast. In the embodiments of the present application, the size of the micro light emitting diodes 122 is 50 μm to 300 μm.

The micro light emitting diode light board (12) may only include micro light emitting diodes 122 of one color, or micro light emitting diodes 122 of various colors, which is not limited here.

The reflective layer 123 is located on a surface of a side of the circuit board 121 close to the micro light emitting diodes 122. The reflective layer 123 and the circuit board 121 are substantially same in shape, and the reflective layer 123 includes a plurality of openings for exposing the micro light emitting diodes 122.

The reflective layer 123 is a protective layer located above the circuit board and is configured for protecting the circuit board and performing diffuse reflection on the incident light rays. In the embodiments of the present application, the reflective layer 123 may be formed in the way that the surface of the circuit board 121 is coated with white oil or other materials having light reflecting properties and then the areas of the bonding pads for welding the micro light emitting diodes 122 are exposed through processes such as etching.

The reflective layer 123 has light reflecting property, so that when the light rays emitted from the micro light emitting diode light board 122 are reflected to one side of the back plate by elements in the backlight module, the light rays may be reflected to the light emitting side again by the reflective layer 123, thereby improving the use efficiency of the light source.

The packaging layer 124 is located on surfaces of a side of the micro light emitting diodes 122 away from the circuit board 121. The packaging layer 124 may be arranged individually or as a whole layer. When being arranged individually, the packaging layer 124 only covers the surfaces of the micro light emitting diodes 122, while no pattern is arranged in other regions of the circuit board; and when being arranged as the whole layer, the packaging layer 124 covers the whole circuit board 121 and the surfaces of the micro light emitting diodes 122.

The packaging layer 124 is configured to protect the micro light emitting diodes 122 and prevent foreign items from entering the micro light emitting diodes 122. In the embodiment of the present application, the packaging layer 124 may be made of a transparent material, such as silica gel or epoxy resin. The packaging layer 124 may be manufactured in a point coating or whole-face coating mode.

Referring to FIG. 2, the whole packaging layer 124 may cover the surfaces of the micro light emitting diodes 122, and the surfaces of the micro light emitting diodes 122 and the surface of the circuit board 121 are coated with one packaging layer 124 in a spot-coated mode, so packaging efficiency is high.

Figure 3:
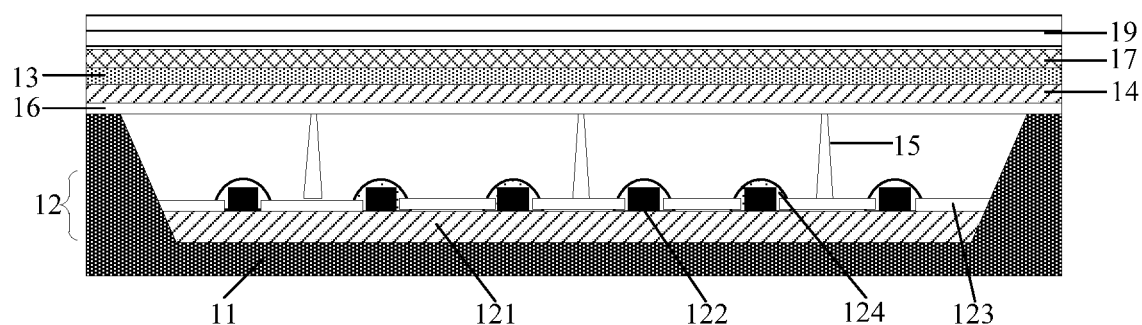
FIG. 3 is a second schematic cross-sectional view of a backlight module according to an embodiment of the present application.
Figure 4:
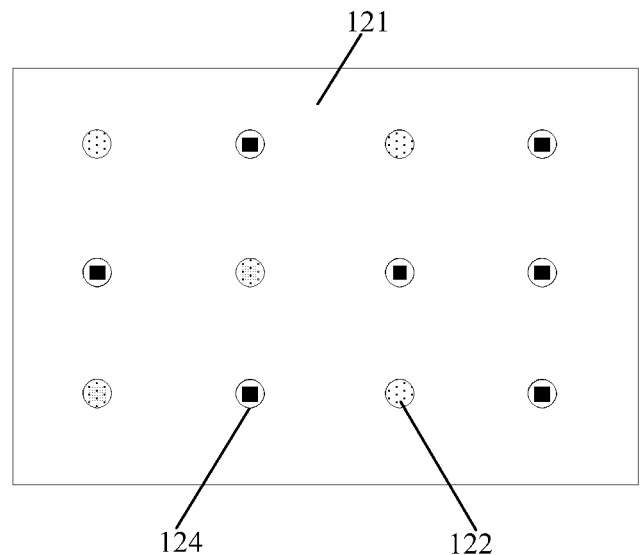
FIG. 4 is a schematic top view of a micro light emitting diode light board in FIG. 3.

FIG. 3 is a schematic cross-sectional view of the backlight module according to an embodiment of the present application. FIG. 4 is a schematic top view of the micro light emitting diode light board in FIG. 3.

Referring to FIG. 3 and FIG. 4, the whole packaging layer 124 may cover the surfaces of the micro light emitting diodes 122, and only the surfaces of the micro light emitting diodes 122 are coated with the packaging layer 124 in the spot-coated mode, so that the packaging layer 124 has individual dot array patterns. Forming the packaging layer 124 in the spot-coated mode may save materials and lower the packaging cost.

Figure 5:
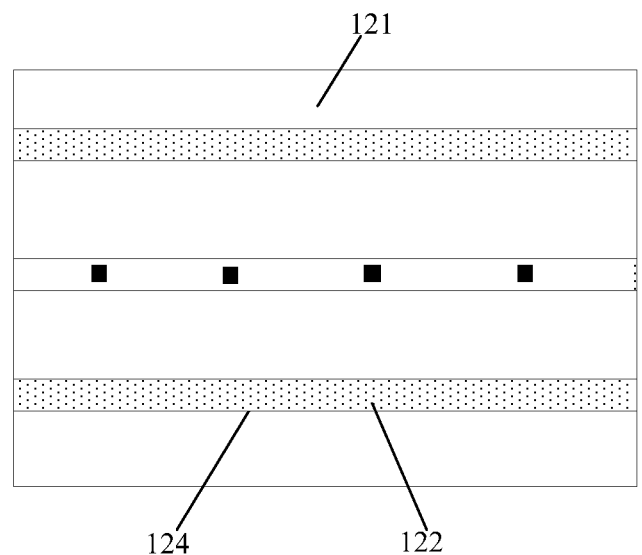
FIG. 5 is a first schematic top view of a micro light emitting diode light board according to an embodiment of the present application.
Figure 6:
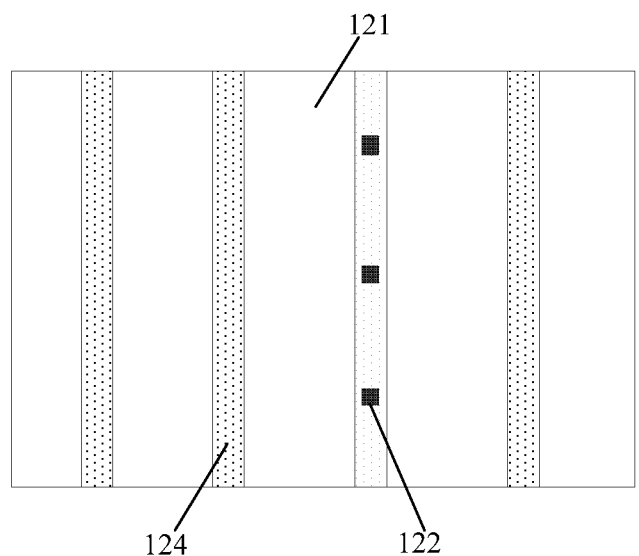
FIG. 6 is a second schematic top view of a micro light emitting diode light board according to an embodiment of the present application.

FIG. 5 is a schematic top view of the micro light emitting diode light board according to an embodiment of the present application. FIG. 6 is a schematic top view of the micro light emitting diode light board according to an embodiment of the present application.

Referring to FIG. 5, the packaging layer 124 may be formed by whole-row coating in a direction of micro light emitting diode rows, or, referring to FIG. 6, the packaging layer 124 may also be formed by whole-column coating in a direction of micro light emitting diode columns, so that the packaging layer 124 has individual strip-shaped patterns. The packaging layer 124 formed in a whole-row/column coated mode has high packaging efficiency, and materials of packaging glue may be saved as well.

The diffusion layer 13 is located on a light emitting side of the light source 12. The diffusion layer 13 is arranged as a whole layer, and a shape of the diffusion layer 13 is substantially same as the shape of the back plate 11. Usually, the diffusion layer 13 may be rectangular or square.

The diffusion layer 13 is configured to scatter the incident light rays to make the light rays passing the diffusion layer 13 more uniform. Scattering particle materials are arranged in the diffusion layer 13, and the light rays will be refracted and reflected continuously after entering the scattering particle materials, so that the effect of scattering the light rays is realized to achieve the effect of light uniformizing.

The diffusion layer 13 may adopt two forms, a diffusion plate or a diffusion sheet. The diffusion plate may be used for a large display apparatus such as a television; while the diffusion sheet may be used for a small display apparatus such as a mobile phone and a smart watch.

A thickness of the diffusion plate is larger than that of the diffusion sheet and is 1.5 mm to 3 mm. The diffusion plate has larger haze and better uniformizing effect, and usually may be processed through an extrusion process. A material for the diffusion plate is generally selected from at least one of polymethyl methacrylate (PMMA), polycarbonate (PC), polystyrene (PS) or polypropylene (PP).

A thickness of the diffusion sheet is 0.3 mm or below, and the diffusion sheet is relatively thin and more suitable for small and light display apparatuses. According to the diffusion sheet, a base material is usually coated with diffusion particles, the base material may be polyethylene terephthalate (PET) or glass, and the diffusion particles may be titanium dioxide, zinc oxide, calcium oxide and the like.

The first functional layer 14 is located on a side of the diffusion layer 13 facing the light source 12. The first functional layer 14 is arranged as a whole layer with a shape being substantially same as the shape of the diffusion layer 13, which may be square or rectangular usually.

When the light source adopts the micro light emitting diode light board, energy distribution of emitting light of the micro light emitting diodes 122 in the micro light emitting diode light board meets Lamber distribution, and most light energy is concentrated within a small angle range over the micro light emitting diodes 122, causing that the areas over the micro light emitting diodes 122 are bright, junction areas of the adjacent micro light emitting diodes 122 are dark, and the emitting light is not uniformly distributed.

The first functional layer 14 is configured to uniformize the emitting light of the light source 12. The first functional layer 14 may reflect light rays with small incident angles and transmit light rays with large incident angles, in this way, most of light rays with small incident angles emitted from the micro light emitting diodes are reflected when entering the first functional layer 14 because an incident angle is small, while most of light rays with large angles emitted from the micro light emitting diodes are transmitted when entering the first functional layer 14 because an incident angle is large, and thus a brightness difference between light emitting centers and edge areas of the micro light emitting diodes 122 is balanced, thereby solving the problems that the areas over the micro light emitting diodes are too bright and the junction areas of the adjacent micro light emitting diodes are too dark. By arranging the first functional layer 14 on the light emitting side of the micro light emitting diode light board, the uniformity of the emitting light of the micro light emitting diode light board may be improved, so that the quantity of the micro light emitting diodes 122 used may be reduced to achieve backlight thinning design.

In some embodiments of the present application, the first functional layer is an angle selection layer. The angle selection layer is configured that: the larger the angle of the incident light rays, the smaller a reflectivity to the incident light rays; and the larger the angle of the incident light rays, the larger a transmittance to the incident light rays. The angle selection layer is configured to reflect light rays with a first incident angle range and transmit light rays with a second incident angle range. An incident angle value corresponding to the first incident angle range is smaller than an incident angle value corresponding to the second incident angle range.

The first functional layer 14 is usually made of a soft polymer material, and the first functional layer 14 may be attached to a surface of a side of the diffusion layer 13 facing the light source 12.

In the embodiments of the present application, a certain distance needs to be formed between the light source 12 and the diffusion layer 13, to guarantee full light mixing between the micro light emitting diodes 122 so as to guarantee the brightness uniformity of the backlight module.

To prevent deformation of the diffusion layer 13 and keep consistency of the distance between the light source 12 and the diffusion layer 13, a plurality of supports 15 need to be arranged on the back plate to support the diffusion layer 13.

The supports 15 are arranged at interval areas among the micro light emitting diodes 122 and are uniformly distributed. The supports 15 are fixed to the back plate through buckles, screws or pasting.

The supports 15 usually adopt a light transmitting material to prevent the supports 15 from shielding the emitting light of the light source.

The supports 15 may be made of hard materials such as polymethyl methacrylate (PMMA). Ends, close to the diffusion layer 13, of the supports 15 are sharp. The first functional layer 14 is arranged on a side of the diffusion layer 13 facing the light source 12. The material of the first functional layer 14 is soft. Thus the sharp ends of the supports 15 easily puncture the first functional layer 14. When the diffusion layer 13 moves, the supports 15 will unavoidably scratch the first functional layer 14, causing failure of required optical performances of the first functional layer 14, leading poor display and the like.

In the embodiments of the present application, in view of the above issue, the transparent substrate 16 is arranged on a side of the first functional layer 14 facing the light source 12.

The transparent substrate 16 is arranged as a whole layer, a size and a shape of the transparent substrate 16 are substantially same as those of the first functional layer 14, and the shape usually may be a square or a rectangle.

The transparent substrate 16 may be made of light transmitting material with a high transmittance such as polymethyl methacrylate (PMMA) or glass.

The transparent substrate 16 is arranged between the first functional layer 14 and the supports 15 to avoid direct contact between the sharp ends of the supports 15 and the first functional layer 14, so that the first functional layer 14 may be prevented from being damaged and scratched. At the same time, the transparent substrate 16 may further achieve an effect of supporting the first functional layer 14 and the diffusion layer 13, so that two sides of the first functional layer 14 are both supported by plates, and the higher reliability is achieved.

The transparent substrate 16 is usually a parallel flat plate with its upper surface close to the first functional layer 14 and lower surface close to the supports 15, and the upper surface and the lower surface of the transparent substrate 16 are parallel to each other.

The transparent substrate 16 is made of light transmitting material uniform in refraction, a refraction index of the material may have a difference with that of air, the refraction index of the material of the transparent substrate 16 is generally greater than that of air, and the light rays emitted from the light source will be deflected when entering the transparent substrate 16. However, the transparent substrate 16 has no scattering effect or the like for the light rays, and if the upper surface and the lower surface of the transparent substrate 16 are both in contact with air, a propagating direction of the light rays cannot be changed after the light rays pass the transparent substrate 16.

When the light rays emitted from the light source enter the transparent substrate 16 from air, an emitting angle will be reduced accordingly, and in order to avoid the problem that a coverage range of the emitting light of the micro light emitting diodes is shrunk due to the fact that the transparent substrate 16 is too thick, in the embodiments of the present application, a thickness of the transparent substrate 16 may be set in a range of 0.3 mm to 1 mm, so that a good support effect of the transparent substrate 16 is guaranteed, and diffusion of the light rays is not affected.

In the embodiments of the present application, when the light source adopts the micro light emitting diode light board, the micro light emitting diodes 122 may be blue-light micro light emitting diodes to emit blue light, and a wavelength of light rays emitted from the blue-light micro light emitting diodes is 440 nm to 450 nm.

As shown in FIG. 2 and FIG. 3, the backlight module according to the embodiment of the present application further includes: a wavelength conversion layer 17.

The wavelength conversion layer 17 is located on a side of the diffusion layer 13 away from the first functional layer 14. The wavelength conversion layer 17 is arranged as a whole layer with a shape being substantially same as the shape of the back plate 11, which may be square or rectangular usually.

The wavelength conversion layer 17 includes a red light conversion material and a green light conversion material, and under irradiation of the blue light, the red light conversion material is excited to emit red light (620 nm to 640 nm) and the green light conversion material is excited to emit green light (520 nm to 545 nm). Therefore, the wavelength conversion layer 17 is excited by the emitting light of the blue-light micro light emitting diodes to emit the red light and the green light, and the blue light, the red light and the green light are mixed to form white light so as to provide backlight for the panel.

In some embodiments of the present application, the wavelength conversion layer 17 may be a quantum dot layer, the quantum dot layer includes a red quantum dot material and a green quantum dot material, the red quantum dot material is excited by the blue light to emit red light, the green quantum dot material is excited by the blue light to emit green light, and the red light and the green light which are emitted by excitation and the transmitted blue light are mixed to form white light to be emitted.

In other embodiments of the present application, the wavelength conversion layer 17 may be a fluorescent layer, the fluorescent layer includes a red light conversion material and a green light conversion material, the red light conversion material is excited by the blue light to emit red light, the green light conversion material is excited by the blue light to emit green light, and the red light and the green light which are emitted by excitation and the transmitted blue light are mixed to form white light to be emitted.

Figure 7:
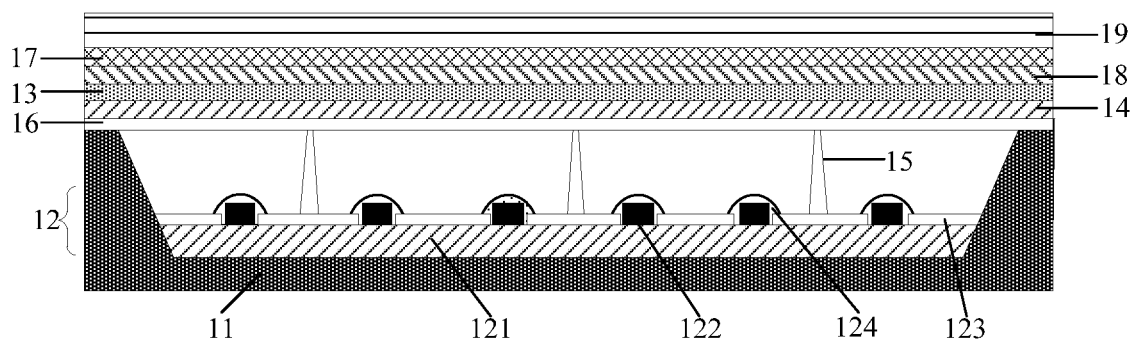
FIG. 7 is a third schematic cross-sectional view of a backlight module according to an embodiment of the present application.

FIG. 7 is a schematic cross-sectional view of the backlight module according to an embodiment of the present application.

Referring to FIG. 7, the backlight module according to the embodiment of the present application further includes: a second functional layer 18.

The second functional layer 18 is located between the wavelength conversion layer 17 and the diffusion layer 13.

The second functional layer 18 is arranged as a whole layer with a shape being substantially same as the shape of the wavelength conversion layer 17, which may be square or rectangular usually.

The second functional layer 18 is configured to transmit light emitted from the light source 12 and reflect excited light emitted from the wavelength conversion layer 17.

The red light and the green light emitted from the wavelength conversion layer 17 by excitation are not only emitted to the light emitting side of the backlight module, but also emitted to one side of the back plate 11. In order to improve use efficiency of the excited light, the second functional layer 18 is arranged between the wavelength conversion layer 17 and the diffusion layer 13, and in this way, the excited light emitted from the wavelength conversion layer 17 to one side of the back plate will enter the second functional layer 18, and this part of exciting light is reflected again by the second functional layer 18 to the light emitting side of the backlight module, so that use efficiency of the light rays is improved.

As shown in FIG. 2, FIG. 3 and FIG. 7, the backlight module according to the embodiments of the present application further includes: an optical film 19 located on a side of the wavelength conversion layer 17 away from the diffusion layer 13.

The optical film 19 is arranged as a whole layer, and a shape of the optical film 19 is substantially same as that of the wavelength conversion layer 17 and usually may be a rectangle or a square.

Arranging the optical film 19 may make the backlight module adaptive to various practical applications.

The optical film 19 may include a prism sheet, and the prism sheet may change an emitting angle of light rays to change a viewing angle of the display apparatus. The prism sheet usually may converge light rays into a front view angle direction, thereby increasing front view angle brightness.

The optical film 19 may further include a reflective polarizer. As a brightness enhancement sheet, the reflective polarizer may increase the brightness of the backlight module, improve use efficiency of light rays, and make emitting light rays have a polarizing property, so a polarizer may be omitted in the liquid crystal panel.

When the light source is the micro light emitting diode light board, in the embodiments of the present application, the first functional layer 14 is configured to reflect the light rays with small angles emitted from the micro light emitting diodes 122 and transmit the light rays with large angles emitted from the micro light emitting diodes 122. A reflectivity of the first functional layer 14 to the incident light rays is decreased with increasing of the angle of the incident light rays.

When the light rays with large angles emitted from the micro light emitting diodes 122 enter the first functional layer 14, the incident angle is large, and most of the light rays are transmitted by the first functional layer 14; while when the light rays with small angles emitted from the micro light emitting diodes 122 enter the first functional layer 14, the incident angle is small, and most of the light rays are reflected by the first functional layer 14, and the reflected light rays are subjected to scattering or diffuse reflection after entering the reflective layer on the micro light emitting diode light board, so that light rays with large emitting angles are generated again to be reflected to the first functional layer 14 so as to be transmitted by the first functional layer 14. By means of the above reflection for several times, the energy of the light rays emitted from the micro light emitting diodes 122 may be not concentrated in the small emitting angle any more, so that the light rays emitted from the micro light emitting diodes 122 are relatively uniform.

A transmittance of the first functional layer 14 to the light rays with an incident angle range of 0° to 70° is gradually increased in a range from 10% to 90%, and a reflectivity to the light rays with an incident angle range of 70° to 90° is less than 10%.

The second functional layer 18 may transmit the light rays with small angles emitted from the micro light emitting diode light board, and meanwhile, reflect the light rays with small angles emitted from the wavelength conversion layer 17 to the light emitting side of the backlight module. In this way, the light rays with small angles emitted from the micro light emitting diode light board may be transmitted by the second functional layer 18, after the light rays with small angles enter the wavelength conversion layer 17, a part of the light rays with small emitting angles in the light rays excited by the wavelength conversion layer 17 will be emitted to one side of the light source, this part of light rays will enter the second functional layer 18 to be reflected by the second functional layer 18 towards the light emitting side of the backlight module, and thus the light rays with small emitting angles emitted from the micro light emitting diode light board and the light rays with small angles excited by the wavelength conversion layer 17 both have good convergence, and the display contrast is improved.

In some embodiments of the present application, the second functional layer is configured to transmit activating light emitted from the light source and reflect exciting light emitted from the wavelength conversion layer. The second functional layer may transmit the small-angle activating light, and at the same time, reflect the small-angle exciting light emitted from the wavelength conversion layer to the light emitting side of the backlight module.

In the embodiment of the present application, the first functional layer 14 and the second functional layer 18 are both arranged by utilizing the principle of film interference. In specific implementations, the first functional layer 14 and the second functional layer 18 each include a plurality of film layers arranged in a laminated mode, and every two adjacent film layers have different refraction indexes. The refraction indexes and thicknesses of the film layers meet film interference conditions.

Figure 8:
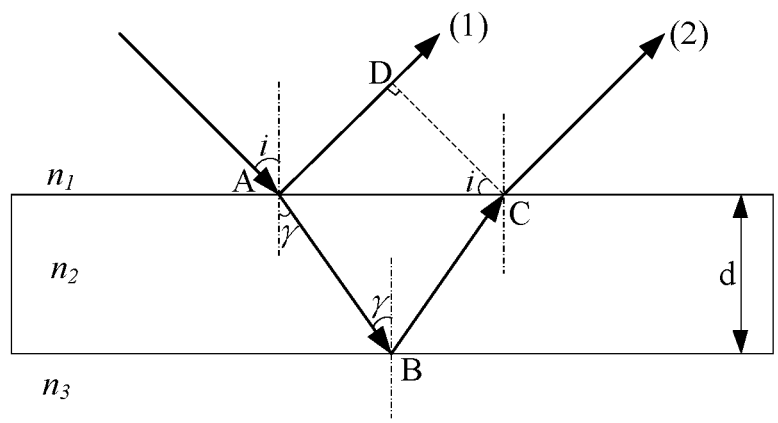
FIG. 8 is a schematic diagram of film interference according to an embodiment of the present application.

FIG. 8 is a schematic diagram of film interference according to the embodiment of the present application.

Referring to FIG. 8, when light rays enter a surface of a thin film with a refraction index being $n_2$ from a medium with a refraction index being $n_1$ with an incident angle of i, light reflection and refraction occur at an interface between two media $n_1$ and $n_2$, a reflection angle and the incident angle are equal and are still i, and a refraction angle is γ; and when refracted light rays enter a lower surface of the thin film, light reflection and refraction also occur on the lower surface, wherein reflected light rays will pass an upper surface of the thin film to be refracted in the medium $n_1$, and thus two beams of reflected light rays (1) and (2) are formed on the upper surface and the lower surface of the thin film. An optical path difference δ' between the reflected light ray (1) and the reflected light ray (2) is:

$$\delta' = n_2(\overline{AB} + \overline{BC}) - n_1\overline{AD}.$$

If a thickness of the thin film with the refraction index being $n_2$ is d and the thickness of the thin film is uniform, due to $\overline{AB}=\overline{BC}=d/\cos \gamma$ and $\overline{AD}=\overline{AC} \sin i=2d \tan \gamma \times \sin i$, the following may be obtained:

$$\delta' = n_2 2\overline{AB} - n_1\overline{AD} = \frac{2n_2 d}{\cos \gamma} - 2n_1 d \tan \gamma \times \sin i = \frac{2d}{\cos \gamma}(n_2 - n_1 \sin i \sin \gamma).$$

It can be known from the refraction law that:

$$n_1 \sin i = n_2 \sin \gamma;$$

so:

$$\delta' = \frac{2dn_2}{\cos r}(1 - \sin^2 \gamma) =$$

$$\frac{2n_2 d}{\cos \gamma}\cos^2 \gamma = 2n_2 d \cos \gamma = 2n_2 d\sqrt{1 - \sin^2 \gamma} = 2d\sqrt{n_2^2 - n_1^2 \sin^2 i}.$$

It can be seen from the above formula that, if a multi-layer film structure is arranged, an optical path difference between reflected light of the light rays on the upper and lower surfaces of each layer of medium is only related to a refraction index and a thickness of this layer and an incident angle. In practical applications, light rays usually enter a thin film from an air medium, light reflection occurs on an upper surface and a lower surface of the thin film, that is, the refraction index in the above formula is $n_1=1$, and thus the above formula may be simplified as:

$$\delta' = 2d\sqrt{n_2^2 - n_1^2 \sin^2 i} = 2d\sqrt{n_2^2 - \sin^2 i}.$$

It can be known from the principle of film interference that, when the optical path difference between the reflected light rays on the upper surface and the lower surface of the thin film is integer times of a wavelength, the two beams of light rays are coherently added; and when the optical path difference between the reflected light rays on the upper surface and the lower surface is odd times of a half-wavelength, the two beams of light rays are coherently subtracted. According to the principle of energy conservation, if the reflected light is coherently added, energy of the reflected light is enhanced, and energy of transmission light is weakened; and if the reflected light is coherently subtracted, the energy of the reflected light is weakened, and the energy of the transmission light is enhanced.

When the above principle is applied to the embodiment of the present application, for any film layer in the first functional layer 14 and the second functional layer 18, an incident angle of reflection enhancement is set as $\theta_1$ and an incident angle of anti-reflection is set as $\theta_2$, and by utilizing the above principle, a proper film layer material may be selected, so that the refraction index and the thickness of the film layer meet reflection enhancement to light rays with the incident angle $\theta_1$ and anti-reflection of light rays with the incident angle $\theta_2$.

The present application further provides a structure of a backlight module.

Figure 9:
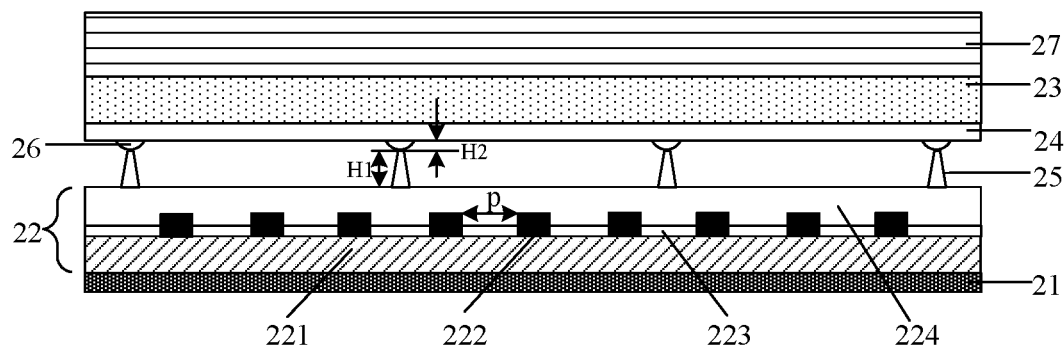
FIG. 9 is a schematic cross-sectional view of a backlight module according to an embodiment of the present application.

FIG. 9 is a first schematic cross-sectional view of the backlight module according to an embodiment of the present application.

Referring to FIG. 9, the backlight module includes: a back plate 21, a micro light emitting diode light board 22, a diffusion plate 23 and a functional layer 24.

The back plate 21 is located at the bottom of the backlight module and configured for support. Usually, the back plate 21 is of a square structure, and when the back plate is applied to a special-shaped display apparatus, a shape of the back plate is adaptive to a shape of the display apparatus. The back plate 21 includes a top side, a bottom side, a left side and a right side. The top side and the bottom side are opposite, the left side and the right side are opposite, the top side is connected with one end of the left side and one end of the right side, and the bottom side is connected with the other end of the left side and the other end of the right side.

The back plate 21 is made of aluminum, iron, aluminum alloy or iron alloy. The back plate 21 is configured to fix the micro light emitting diode light board 22 and support and fix edge areas of components such as an optical film and the diffusion plate, and the back plate 21 also has an effect of dissipating heat for the micro light emitting diode light board 22.

In the embodiment of the present application, the backlight module is a direct backlight module, and the micro light emitting diode light board 22 is located on the back plate 21. Usually, the whole micro light emitting diode light board 22 may be square or rectangular, with a length of 200 mm to 800 mm and a width of 100 mm to 500 mm.

A plurality of micro light emitting diode light boards 22 may be arranged according to a size of the display apparatus, and the micro light emitting diode light boards 22 are spliced to jointly provide backlight. In order to avoid optical problems caused by splicing of the micro light emitting diode light boards 22, splicing seams between the adjacent micro light emitting diode light boards 22 are made as small as possible, and even seamless splicing is achieved.

As a backlight source, compared with a traditional light emitting diode, the micro light emitting diode light board 22 has a smaller size and can achieve finer dynamic control and improve dynamic contrast of the display apparatus.

The micro light emitting diode light board 22 includes: a circuit board 221, micro light emitting diodes 222, a reflective layer 223 and an packaging layer 224.

The circuit board 221 is located on the back plate 21, and a shape of the circuit board 221 is substantially same as an overall shape of the micro light emitting diode light board 22. Usually, the circuit board 221 is in a plate shape and is rectangular or square as a whole. The circuit board 221 has a length of 200 mm to 800 mm and a width of 100 mm to 500 mm.

In the embodiment of the present application, the circuit board 221 may be a printed circuit board (PCB), the PCB includes an electronic circuit and an insulating layer, and the insulating layer exposes at least one bonding pad in the electronic circuit for welding the micro light emitting diodes 222 and covers remaining parts in the electronic circuit.

Or, the circuit board 221 may also be an array substrate formed by manufacturing a thin film transistor driving circuit on a base substrate, and a surface of the array substrate has electrodes connected to the thin film transistor driving circuit for welding the micro light emitting diodes 222.

A base or substrate of the circuit board 221 may be made of materials such as FR4 or glass. Or, the base or a base substrate of the above circuit board 221 may be made of a flexible material to form a flexible circuit board.

The circuit board 221 is configured to provide a driving electric signal for the micro light emitting diodes 222. The micro light emitting diodes 222 and the circuit board 221 are separately manufactured, a surface of the circuit board 221 includes a plurality of bonding pads for welding the micro light emitting diodes 222, the micro light emitting diodes 222 are transferred above the bonding pads after being manufactured, the micro light emitting diodes 222 are welded to the circuit board 221 through processes such as reflow soldering, and thus the micro light emitting diodes 222 may be driven to emit light by controlling an input signal of the circuit board 221.

The micro light emitting diodes 222 are located on the circuit board. Electrodes of the micro light emitting diodes 222 are welded to the bonding pads exposed on the circuit board 221 to achieve electric connection therebetween.

The micro light emitting diodes 222 are different from ordinary light emitting diodes, and specifically refer to micro light emitting diode chips without packaging supports. Since the micro light emitting diodes 222 have small sizes, dynamic light emitting of the backlight module can be controlled to smaller partitions, which facilitates increase of picture contrast. In the embodiment of the present application, the size of the micro light emitting diodes 222 is 500 µm or below.

The micro light emitting diode light board 22 may only include micro light emitting diodes 222 of one color, or micro light emitting diodes of various colors, which is not limited here.

The reflective layer 223 is located on a surface of a side of the circuit board 221 facing the micro light emitting diodes 222. The reflective layer 223 and the circuit board 221 are substantially same in shape, and the reflective layer 223 includes a plurality of openings for exposing the micro light emitting diodes 222.

The reflective layer 223 is a protective layer on the surface of the circuit board 221 and has an effect of diffuse reflection to incident light rays, and when the light rays emitted from the micro light emitting diodes 222 are reflected to one side of the back plate by elements in the backlight module, the light rays may be reflected to the light emitting side again by the reflective layer 223, thereby improving the efficiency of the light source.

The reflective layer 223 may be formed by coating the surface of the circuit board 221 with white oil with a high reflectivity.

The packaging layer 224 is located on a surface of a side of the micro light emitting diodes 222 away from the circuit board 221. The packaging layer 224 may be arranged individually or as a whole layer. When being arranged individually, the packaging layer 224 only covers the surfaces of the micro light emitting diodes 222, while no pattern is arranged in other regions of the circuit board; and when being arranged as the whole layer, the packaging layer 224 covers the whole circuit board 221 and the surfaces of the micro light emitting diodes 222.

The packaging layer 224 is configured to protect the micro light emitting diodes 222 and prevent foreign items from entering the micro light emitting diodes 222. In the embodiment of the present application, the packaging layer 224 may be made of a transparent material, such as silica gel or epoxy resin. The packaging layer 224 may be manufactured in a point coating or whole-face coating.

Referring to FIG. 9, the whole packaging layer 224 may cover the surfaces of the micro light emitting diodes 222, and the surfaces of the micro light emitting diodes 222 and the surface of the circuit board 221 are coated with one packaging layer 224 in a spot-coated mode, so packaging efficiency is high.

Figure 10:
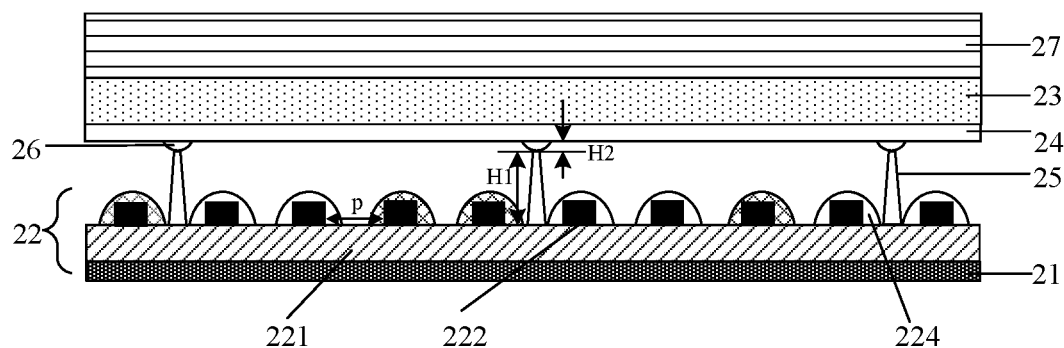
FIG. 10 is a schematic cross-sectional view of a backlight module according to an embodiment of the present application.
Figure 11:
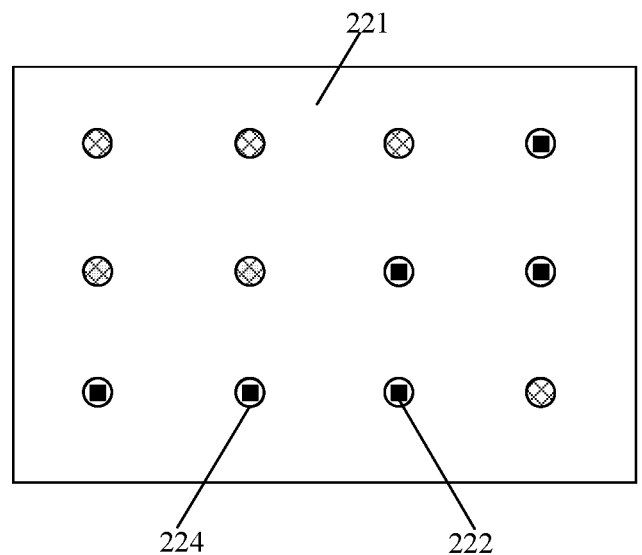
FIG. 11 is a schematic top view of a micro light emitting diode light board in FIG. 10.

FIG. 10 is a second schematic cross-sectional view of the backlight module according to an embodiment of the present application. FIG. 11 is a schematic top view of the micro light emitting diode light board in FIG. 10.

Referring to FIG. 10 and FIG. 11, the whole packaging layer 224 may cover the surfaces of the micro light emitting diodes 222, and only the surfaces of the micro light emitting diodes 222 are coated with the packaging layer 224 in the spot-coated mode, so that the packaging layer 224 has mutually discrete dot patterns. Forming the packaging layer 224 in the spot-coated mode may save materials and lower the packaging cost.

Figure 12:
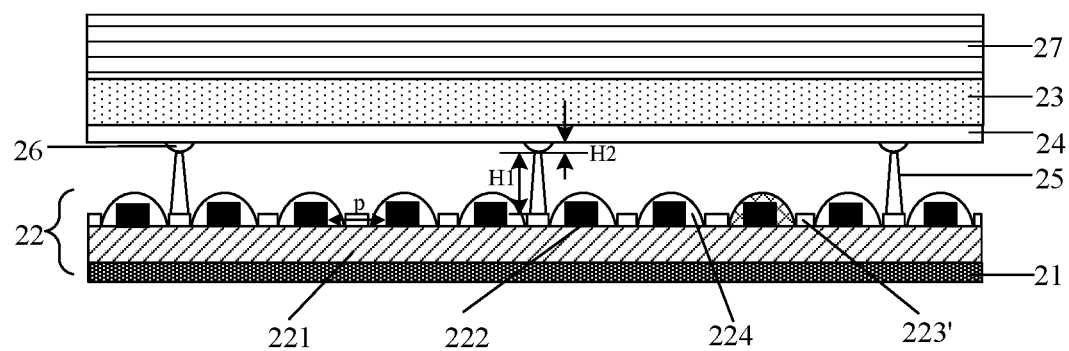
FIG. 12 is a schematic cross-sectional view of a backlight module according to an embodiment of the present application.

FIG. 12 is a third schematic cross-sectional view of the backlight module according to the embodiment of the present application.

Referring to FIG. 12, in order to improve the use efficiency of the light rays, a reflective sheet 223' is further arranged on a side of the circuit board 221 facing the micro light emitting diodes 222. The reflective sheet 223' is provided with openings for exposing the micro light emitting diodes 222 and the packaging layer 224 above the micro light emitting diodes, and is configured to reflect light rays emitted from the micro light emitting diodes 222 to one side of the back plate to the light emitting side again, thereby improving the use efficiency of the light rays.

Figure 13:
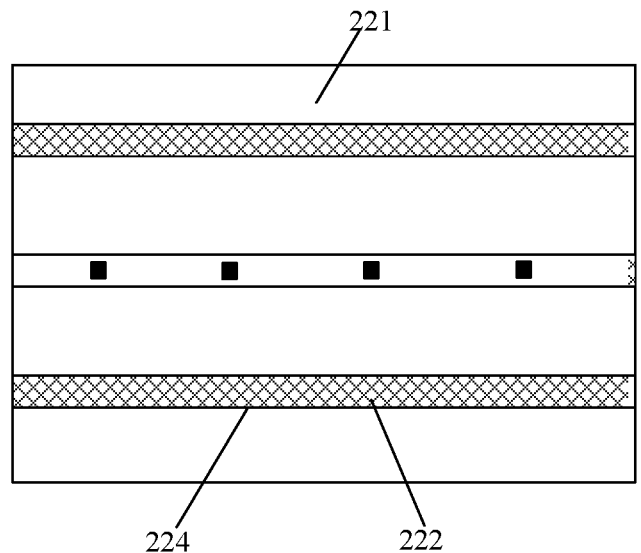
FIG. 13 is a schematic top view of a micro light emitting diode light board according to an embodiment of the present application.
Figure 14:
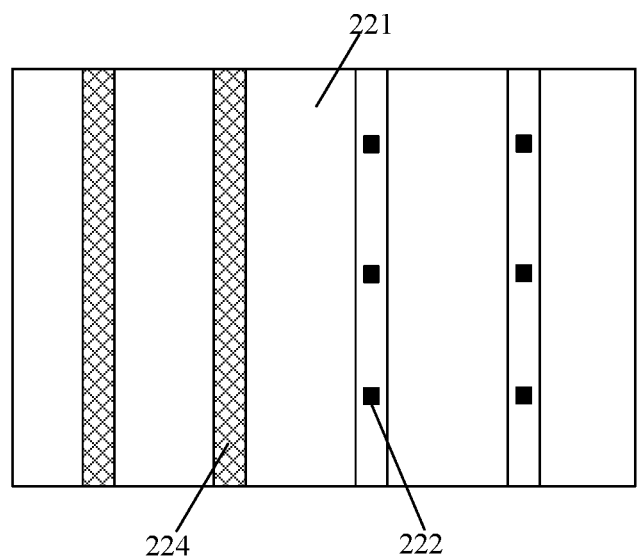
FIG. 14 is a schematic top view of a micro light emitting diode light board according to an embodiment of the present application.

FIG. 13 is a first schematic top view of the micro light emitting diode light board according to an embodiment of the present application. FIG. 14 is a second schematic top view of the micro light emitting diode light board according to an embodiment of the present application.

Referring to FIG. 13 and FIG. 14, the packaging layer 224 may cover micro light emitting diode rows or micro light emitting diode columns. Referring to FIG. 13, the packaging layer 224 is formed by whole-row coating in a direction of the micro light emitting diode rows, or, referring to FIG. 14, the packaging layer 224 is formed by whole-column coating in a direction of the micro light emitting diode columns, so that the packaging layer 224 has mutually discrete strip-shaped patterns. The packaging layer 224 formed in a whole-row/column coated mode has high packaging efficiency, and materials of packaging glue may be saved at the same time.

The diffusion plate 23 is located on the light emitting side of the micro light emitting diode light board 22. A shape of the diffusion plate 23 is substantially same as that of the micro light emitting diode light board 22. Usually, the diffusion plate 23 may be rectangular or square. A thickness of the diffusion plate 23 is 1.5 mm to 3 mm.

The diffusion plate 23 is configured to scatter incident light rays to make the light rays passing the diffusion plate 23 more uniform. Scattering particle materials are arranged in the diffusion plate 23, and the light rays will be refracted and reflected continuously after entering the scattering particle materials, so that the effect of scattering the light rays is achieved to contribute to light uniformizing.

The diffusion plate 23 usually has the larger haze and the more obvious uniformizing effect, and usually may be processed through an extrusion process. A material for the diffusion plate 23 is generally selected from at least one of polymethyl methacrylate (PMMA), polycarbonate (PC), polystyrene (PS) or polypropylene (PP).

In the embodiment of the present application, a certain distance needs to be set between the micro light emitting diode light board 22 and the diffusion plate 23, to guarantee full light mixing between light sources so as to guarantee the brightness uniformity of the backlight module.

The functional layer 24 is located on a side of the diffusion plate 23 facing the micro light emitting diode light board 22. The functional layer 24 and the diffusion plate 23 are attached.

In the embodiment of the present application, the functional layer 24 is a special optical film and is configured to reflect light rays with small incident angles emitted from the micro light emitting diode light board 22 and transmit light rays with large incident angles emitted from the micro light emitting diode light board 22 to balance a brightness difference between light emitting centers and edge areas of the micro light emitting diodes 222, thereby solving the problems that areas over the micro light emitting diodes are too bright while junction areas of the adjacent micro light emitting diodes are too dark. By arranging the functional layer 24 on the light emitting side of the micro light emitting diode light board 22, the uniformity of emitting brightness is improved, and the quantity of the micro light emitting diodes is reduced to achieve backlight thinning design.

The functional layer 24 usually includes film layers which have different refraction indexes and arranged in a laminated mode, thicknesses of the film layers are at a nanometer order, and the film layers are usually made of soft polymer materials.

The backlight module according to an embodiment of the present application further includes supports 25 for supporting the diffusion plate 23. Referring to FIG. 9, FIG. 10 and FIG. 12, the supports 25 are distributed between the micro light emitting diode light board 22 and the functional layer 24.

The supports 25 are distributed at interval areas among the micro light emitting diodes 222 to avoid affecting light emitting from the micro light emitting diodes 222. The supports 25 are fixed to the micro light emitting diode light board through buckles, screws or pasting.

Figure 15:
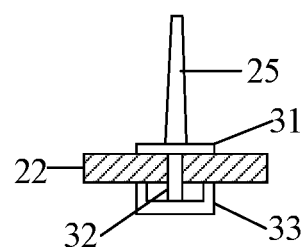
FIG. 15 is a schematic diagram of a connection relationship between supports and a micro light emitting diode light board according to an embodiment of the present application.
Figure 16:
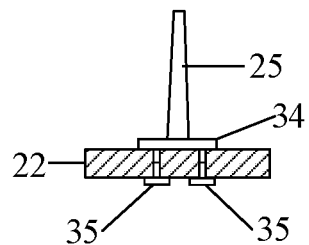
FIG. 16 is a schematic diagram of a connection relationship between supports and a micro light emitting diode light board according to an embodiment of the present application.
Figure 17:
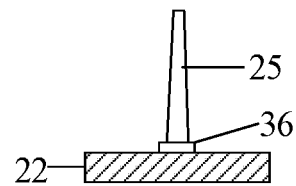
FIG. 17 is a schematic diagram of a connection relationship between supports and a micro light emitting diode light board according to an embodiment of the present application.

FIG. 15 to FIG. 17 are schematic diagrams of connection relationships between the supports and the micro light emitting diode light board according to an embodiment of the present application.

Referring to FIG. 15, the support 25 is fixed to the micro light emitting diode light board 22 through a limiting sheet 31, an auxiliary column 32 and a buckle 33. The limiting sheet 31 and the buckle 33 are located at two ends of the auxiliary column 32 respectively. After the buckle 33 is closed, the limiting sheet 31 and the buckle 33 clamp the micro light emitting diode light board 22 to fix the support 25 to the micro light emitting diode light board 22.

Referring to FIG. 16, the support 25 is connected with base 34. The base 34 is fixed to the micro light emitting diode light board 22 through a screw 35, and the support 25 may be dismantled by rotating the screw 35.

Referring to FIG. 17, the support 25 is directly attached to a surface of the micro light emitting diode light board 22 through glue 36 (e.g., double-sided glue, solid glue or liquid glue).

The supports 25 may be made of hard materials such as polymethyl methacrylate (PMMA). Ends, close to the functional layer 24, of the supports 25 are sharp, while the material of the functional layer 24 is soft, and thus the sharp ends of the supports 25 will puncture the functional layer 24 easily, causing damage or displacement of the functional layer 24, and leading to failure of required optical performances.

In view of this, in the embodiment of the present application, a cushion portion 26 is arranged between the support 25 and the functional layer 24. The cushion portion 26 is in contact with the support 25 and the functional layer 24 respectively. The cushion portion 26 achieves an effect of mitigate or reduce pressure of the supports 25 on the functional layer 24 to prevent the sharp ends of the support 25 from damaging the functional layer 24 so as to guarantee that the optical performances of the functional layer 24 are achieved.

The cushion portion 26 adopts elastic materials such as silica gel or epoxy resin, in this way, after being placed on the diffusion plate 23, the cushion portion 26 has a certain deformation to relieve the pressure of the supports 25 on the functional layer 24 so as to achieve an effect of protecting the functional layer 24.

In the embodiment of the present application, the cushion portion 26 may be located on a surface of a side of the support 25 facing the functional layer 24 or a surface of a side of the functional layer 24 facing the supports 25.

The cushion portion 26 is formed by dispensing. When the cushion portion 26 is located on the surface of the side of the support 25 facing the functional layer 24, the cushion portion 26 may be formed at top end of the support 25 in a dispensing mode and then the diffusion plate 23 with the functional layer 24 attached is placed on the support 25. When the cushion portion 26 is located on the surface of the side of the functional layer 24 facing the support 25, the cushion portion 26 may be formed at areas, corresponding to the support 25, of the functional layer 24 in a dispensing mode and then the diffusion plate 23 with the functional layer 24 attached is placed on the supports 25 in an aligned mode.

Referring to FIG. 9, FIG. 10 and FIG. 12, an area of a cross section parallel to the functional layer 24 of the cushion portion 26 is greater than an area of a cross section parallel to the functional layer 24 of one ends of the support 25 close to the functional layer 24. When a size of the cushion portion 26 is set to be greater than a size of the top end of the support 25, it may be guaranteed that the top end of the supports 25 and the cushion portion 26 have good contact and the support 25 cannot be in direct contact with the functional layer 24.

In the embodiment of the present application, a shape of the cushion portion 26 may be set as a sphere, a hemisphere or an ellipsoid, and a shape of the support 25 may be set as a tetrahedron, a pyramid, a cone, a cuboid, a cube or a cylinder, which are not limited here.

The supports 25 is configured to guarantee a set distance between the micro light emitting diode light board 22 and the diffusion plate 23, however, too high support 25 will affect an overall thickness of the backlight module, not meeting a thinning design requirement of the micro light emitting diode light board, and thus a height of the support 25 is set to be less than 6 mm.

The height of the support 25 may be designed according to combination of the optical films in the backlight module, the haze and thickness of the diffusion plate 23 and other requirements. A ratio H/p of an optical distance to a distance between every two adjacent micro light emitting diodes usually may reflect the overall thickness of the backlight module and a quantity of the micro light emitting diodes used in the backlight module. The smaller the H/p value, the smaller the optical distance, and the thinner the whole device; and the larger the distance between the adjacent micro light emitting diodes, the fewer micro light emitting diodes required, so the cost is lowered.

In the embodiment of the present application, the height of the support 25 and the height of the cushion portion 26 meet a following relationship:

$$0.2 \leq (H1 + H2 - \Delta H)/p \leq 0.8.$$

H1 represents the height of the support 25, H2 represents an original height of the cushion portion 26, ΔH represents a deformation of the cushion portion 26, and p represents the distance between every two adjacent micro light emitting diodes 222.

The optical distance refers to a vertical distance from the micro light emitting diodes 222 to the diffusion plate 23. In the embodiment of the present application, the support 25 and the cushion portion 26 further needs to be arranged between the diffusion plate 23 and the micro light emitting diode light board 22, and the cushion portion 26 will be extruded in a mounting process to generate a deformation. Therefore, a sum of the height H1 of the support 25, the height H2 of the cushion portion 26 and the deformation ΔH of the cushion portion 26 may reflect the optical distance, while the ratio of the optical distance to the distance between every two adjacent micro light emitting diodes may reflect the overall thickness of the backlight module and the quantity of the micro light emitting diodes used. Setting 0.2≤(H1+H2−ΔH)/p≤0.8 may meet design requirements of various backlight modules.

If the optical distance needs to be relatively large, the height of the support 25 may be correspondingly increased if not changing other element structures of the backlight module. If the optical distance needs to be relatively small, the height of the supports 25 may be correspondingly decreased if not changing other element structures of the backlight module. Therefore, the (H1+H2−ΔH)/p value of the backlight module may be flexibly set.

In order to optimize light emitting of the backlight module, the backlight module according to an embodiment of the present application further includes a group of films 27 located on a side of the diffusion plate 23 away from the micro light emitting diode light board 22.

The group of films 27 is arranged as a whole layer with a shape being substantially same as that of the micro light emitting diode light board 22, which usually may be a rectangle or a square.

Arranging the group of films 27 may allow the backlight module adaptive to various practical applications.

When the micro light emitting diodes 222 in the micro light emitting diode light board 22 adopt blue-light micro light emitting diodes, the group of films 27 includes a quantum dot layer or a fluorescent layer.

The quantum dot layer includes a red quantum dot material and a green quantum dot material, the red quantum dot material is excited by blue light to emit red light, the green quantum dot material is excited by the blue light to emit green light, and the red light and the green light which are emitted by excitation and the transmitted blue light are mixed to form white light to be emitted.

The fluorescent layer includes a fluorescent material which is excited to emit red light and green light, and the red light and the green light which are emitted by excitation and the transmitted blue light are mixed to form white light to be emitted.

Besides, the group of films 27 may further include a prism sheet, and the prism sheet may change an emitting angle of light rays to change a view angle of the display apparatus.

The group of films 27 may further include a reflective polarizer. As a brightness enhancement sheet, the reflective polarizer may increase the brightness of the backlight module, improve use efficiency of light rays, and make emitting light rays have a polarizing property, so a polarizer may be omitted in the liquid crystal panel.

The functional layer 24 in the embodiment of the present application may be at least one of the first functional layer or the second functional layer, and may also be a functional layer with other functions.

Apparently, those skilled in the art can make various modifications and variations to the present application without departing from the spirit and scope of the present application. These modifications and variations of the present application shall fall within the scope of the claims of the present application.

What is claimed is:

1. A display apparatus, comprising:
a panel, configured to display an image;
a light source on an incident side of the panel, configured to provide backlight for the panel;
a diffusion plate on a light emitting side of the light source;
a functional layer on a side of the diffusion plate facing the light source;
a support between the light source and the functional layer and configured to support the diffusion plate; and
a cushion portion between the support and the functional layer and configured to contact the support and the functional layer so as to mitigate pressure of the support for the functional layer;
wherein the cushion portion is made of silica gel or epoxy resin;
the light source is a micro light emitting diode light board, and a height of the cushion portion and a height of the support meet a following relationship:

$$0.2 \leq (H1+H2-\Delta H)/p \leq 0.8;\ \text{wherein}$$

H1 represents a height of the support, H2 represents an original height of the cushion portion, ΔH represents a deformation of the cushion portion, and p represents a distance between every two adjacent micro light emitting diodes in the micro light emitting diode light board.

2. The display apparatus according to claim 1, wherein the cushion portion is on a surface of a side of the support facing the functional layer; or
the cushion portion is on a surface of a side of the functional layer facing the support.

3. The display apparatus according to claim 1, wherein an area of a cross section of the cushion portion parallel to the functional layer is greater than an area of a cross section of the support parallel to the functional layer and close to the functional layer.

4. The display apparatus according to claim 3, wherein the cushion portion is of a shape of a sphere, a hemisphere or an ellipsoid; and
the support is of a shape of a tetrahedron, a pyramid, a cone, a cuboid, a cube or a cylinder.

5. The display apparatus according to claim 1, wherein the height of the support is smaller than 6 mm.

6. The display apparatus according to claim 1, wherein the support is fixed to the micro light emitting diode light board through buckles, screws or adhesive.

7. The display apparatus according to claim 6, wherein the support is fixed to the micro light emitting diode light board through a limiting sheet, an auxiliary column and a buckle.

8. The display apparatus according to claim 7, wherein the limiting sheet and the buckle are at two ends of the auxiliary column respectively.

9. The display apparatus according to claim 1, wherein the micro light emitting diode light board comprises:
   a circuit board, configured to provide a driving signal;
   at least one micro light emitting diodes on the circuit board in an array;
   an packaging layer on a surface of a side of the micro light emitting diode away from the circuit board; and
   a reflective sheet on a surface of a side of the circuit board facing the micro light emitting diode, wherein the reflective sheet is provided with openings for exposing the at least one micro light emitting diodes;
   wherein the support is fixed at interval area among the at least one micro light emitting diodes.

10. The display apparatus according to claim 9, wherein the packaging layer is configured to cover surfaces of the micro light emitting diodes as a whole layer; or
   the packaging layer is configured to cover the surfaces of the micro light emitting diodes, and the packaging layer has individual dot patterns; or
   the packaging layer covers micro light emitting diode rows or micro light emitting diode columns, and the packaging layer has individual strip-shaped patterns.

11. The display apparatus according to claim 1, wherein a thickness of the diffusion plate is 1.5 mm to 3 mm.

12. The display apparatus according to claim 1, wherein the diffusion plate has scattering particle materials inside.

13. The display apparatus according to claim 1, wherein the functional layer is configured to reflect light rays with small incident angles emitted from the light source and transmit light rays with large incident angles emitted from the light source.

14. The display apparatus according to claim 1, wherein the functional layer comprises film layers with different refraction indexes and arranged in a laminated mode.

15. The display apparatus according to claim 1, wherein the support is distributed at interval area among the micro light emitting diodes.

16. The display apparatus according to claim 1, further comprising: a group of films on a side of the diffusion plate away from the light source.

17. The display apparatus according to claim 16, wherein the group of films comprises a quantum dot layer or a fluorescent layer.

18. The display apparatus according to claim 16, wherein the group of films comprises a prism sheet.

* * * * *